US008972702B2

(12) United States Patent
Banerjee et al.

(10) Patent No.: US 8,972,702 B2
(45) Date of Patent: Mar. 3, 2015

(54) SYSTEMS AND METHODS FOR POWER MANAGEMENT IN A HIGH PERFORMANCE COMPUTING (HPC) CLUSTER

(75) Inventors: Pradipta K. Banerjee, Karnataka (IN); Anbazhagan Mani, Karnataka (IN); Rajan Ravindran, Bangalore (IN); Vaidyanathan Srinivasan, Bangalore (IN)

(73) Assignee: Intenational Business Machines Corporation, Armonk, NY (US)

( * ) Notice: Subject to any disclaimer, the term of this patent is extended or adjusted under 35 U.S.C. 154(b) by 1078 days.

(21) Appl. No.: 12/627,589

(22) Filed: Nov. 30, 2009

(65) Prior Publication Data

US 2011/0131425 A1 Jun. 2, 2011

(51) Int. Cl.
| | |
|---|---|
| *G06F 15/00* | (2006.01) |
| *G06F 7/38* | (2006.01) |
| *G06F 9/00* | (2006.01) |
| *G06F 9/44* | (2006.01) |
| *G06F 1/32* | (2006.01) |
| *G06F 11/30* | (2006.01) |
| *G06F 11/34* | (2006.01) |
| *G06F 9/50* | (2006.01) |

(52) U.S. Cl.
CPC .......... *G06F 1/3209* (2013.01); *G06F 11/3006* (2013.01); *G06F 11/3055* (2013.01); *G06F 11/3404* (2013.01); *G06F 9/5094* (2013.01); G06F 2201/81 (2013.01)
USPC ........................................................ 712/220

(58) Field of Classification Search
USPC ........................................................ 712/220
See application file for complete search history.

(56) References Cited

U.S. PATENT DOCUMENTS

| | | | | |
|---|---|---|---|---|
| 5,142,684 | A | * | 8/1992 | Perry et al. .................... 713/320 |
| 5,239,641 | A | * | 8/1993 | Horst ............................. 713/375 |
| 5,353,436 | A | * | 10/1994 | Horst ............................. 713/375 |
| 5,384,906 | A | * | 1/1995 | Horst ............................. 713/375 |
| 6,513,124 | B1 | * | 1/2003 | Furuichi et al. ............... 713/322 |
| 7,249,268 | B2 | | 7/2007 | Bhandarkar |
| 2003/0079151 | A1 | * | 4/2003 | Bohrer et al. ................. 713/320 |
| 2003/0200473 | A1 | * | 10/2003 | Fung ............................. 713/320 |
| 2004/0139306 | A1 | * | 7/2004 | Albuz et al. ................... 712/228 |
| 2004/0216114 | A1 | * | 10/2004 | Lin ................................ 718/105 |
| 2005/0088976 | A1 | | 4/2005 | Chafle et al. |
| 2006/0047987 | A1 | * | 3/2006 | Prabhakaran et al. ........ 713/322 |
| 2006/0161375 | A1 | * | 7/2006 | Duberstein et al. ........... 702/132 |
| 2007/0186123 | A1 | * | 8/2007 | Winbom ........................ 713/322 |
| 2009/0064139 | A1 | * | 3/2009 | Arimilli et al. ............... 718/100 |
| 2011/0191783 | A1 | * | 8/2011 | Le Moal ........................ 718/105 |

* cited by examiner

*Primary Examiner* — Andrew Caldwell
*Assistant Examiner* — George Giroux
(74) *Attorney, Agent, or Firm* — Ference & Associates LLC

(57) ABSTRACT

Embodiments of the invention broadly contemplate systems, methods, apparatuses and program products providing a power management technique for an HPC cluster with performance improvements for parallel applications. According to various embodiments of the invention, power usage of an HPC cluster is reduced by boosting the performance of one or more select nodes within the cluster so that the one or more nodes take less time to complete. Embodiments of the invention accomplish this by selectively identifying the appropriate node(s) (or core(s) within the appropriate node(s)) in the cluster and increasing the computing capacity of the selected node(s) (or core(s) within the appropriate node(s)).

21 Claims, 3 Drawing Sheets

SYSTEMS AND METHODS FOR POWER MANAGEMENT IN A HIGH PERFORMANCE COMPUTING (HPC) CLUSTER

BACKGROUND

The subject matter generally relates to high performance computing (HPC) which in turn involves the use of parallel supercomputers and/or computer clusters. A computer cluster is a computing system that consists of multiple (usually mass-produced) processors linked together forming a single system.

Parallel computing typically refers to the simultaneous use of multiple computer resources to sole a computational problem. The multiple computer resources could be a single computer with multiple processors, an arbitrary number of computers or nodes connected via a network, or a combination thereof.

Parallel computing saves time and is advantageous for solving large problems. Parallel computing is currently used in a number of industry segments, which for example include, the energy industry (for seismic analysis, and reservoir analysis), the financial industry (for derivative analysis, actuarial analysis, asset liability management, portfolio risk analysis, and statistical analysis), manufacturing (for mechanical or electric design, process simulation, finite element analysis, and failure analysis), life sciences (for pharmaceutical discovery, protein folding, and medical imaging), media (for bandwidth consumption analysis, digital rendering, and gaming), government (for collaborative research, weather analysis, and high energy physics), et cetera. A use of such parallel computing in other areas is of course possible.

In high performance computing, multiple types of parallel computer architectures exist, which for example include shared multiprocessor systems and distributed memory systems. For example, a Shared Multi-Processor (SMP) system typically includes multiple processors sharing a common memory system.

In a distributed memory system, a cluster is defined by multiple nodes that communicate with each other using a high speed interconnect. A node typically includes a collection of cores or processors that share a single address space. Each node has its own CPU, memory, operating system, and I/O subsystem (for example, a computer box with one or multiple processors or cores is a node). In a distributed memory system, a master node is typically assigned, which is configured to divide work between several slave nodes communicatively connected to the master node. The slave nodes work on their respective tasks and intercommunicate among themselves if there is any need to do so. The slave nodes return back to the master node. The master node assembles the results and further distributes work.

In high performance computing, there are multiple programming models. There is a single program multiple data (SPMD) model and a multiple program multiple data (MPMD) model. In a SPMD model, a single program is run on multiple processors with different data. In a MPMD model, different programs are run on different processors and different tasks may use different data.

For SPMD, in order to have an executable program run on multiple CPUs, a protocol or interface is required to obtain parallelism. Methods to obtain parallelism include automatic parallelization (auto-parallel), requiring no source code modification, open multi-processing (OpenMP), requiring slight source code modification, or a message passing system such as Message Passing Interface (MPI), a standard requiring extensive source code modification. Hybrids such as auto-parallel and MPI or OpenMP and MPI are also possible.

MPI is a language-independent communications protocol used to program high performance computing applications and is ubiquitous in HPC environment. MPI has become a de facto standard for communication among processes that model a parallel program running on a distributed memory system. Most MPI implementations consist of a specific set (library) of routines (API) that can be called from Fortran, C, C++, or from any other language capable of interfacing with such routine libraries.

The assignee of the present application is an implementer of the MPI standard. Also, an implementation known as MPICH is available from the Argonne National Laboratory. The Argonne National Laboratory has continued developing MPICH, and now offers MPICH 2, which is an implementation of the MPI standard. Specifics regarding MPI can easily be learned by reviewing readily available information about MPI.

Most power management techniques currently focus on reducing the compute capacity of a system or group of systems in a cluster to save/limit total power usage. Saving power/energy in an idle system or under utilized systems is a well-known technique.

BRIEF SUMMARY

Embodiments of the invention broadly contemplate systems, methods, apparatuses and program products providing a power management technique for an MPI based HPC cluster with performance improvements for parallel applications. According to various embodiments of the invention, power usage of an MPI based HPC cluster is reduced by boosting the performance of the MPI application so that it takes less time to complete. Embodiments of the invention accomplish this by selectively identifying the appropriate node(s) (or core(s) within the appropriate node(s)) in the cluster and increasing the compute capacity of the selected node(s) (or core(s) within the appropriate node(s)). Embodiments of the invention target the MPI barrier function that is used as a synchronization mechanism for all processes in a communicator.

In summary, one aspect of the invention provides a system comprising: one or more processors; and a computer readable storage medium having computer readable program code embodied therewith and executable by the one or more processors, the computer readable program code comprising: computer readable program code configured to provide a master node configured to track one or more processes executing on one or more nodes of the system; computer readable program code configured to determine a number of the one or more nodes executing one or more processes in the system that are slow to execute a process; and computer readable program code configured to send a boost command to the one or more nodes slow execute the process responsive to determining the number falls below a predetermined threshold.

Another aspect of the invention provides a method comprising: providing a master node configured to track one or more processes executing on one or more nodes of a system; determining a number of the one or more nodes executing one or more processes in the system that are slow to execute a process; and sending a boost command to the one or more nodes slow to execute the process responsive to determining the number falls below a predetermined threshold.

A further aspect of the invention provides a method comprising: executing a process on a node of a high performance computing cluster; and receiving a boost command at the node responsive to a determination that the node is slower to execute the process than one or more other nodes of the high performance computing cluster; wherein the boost command is received from a master node of the high performance computing cluster.

A still further aspect of the invention provides a computer program product comprising: a computer readable storage medium having computer readable program code embodied therewith, the computer readable program code comprising: computer readable program code configured to provide a master node configured to track one or more processes executing on one or more nodes of the system; computer readable program code configured to determine a number of the one or more nodes executing one or more processes in the system that are slow to execute a process; and computer readable program code configured to send a boost command to the one or more nodes slow to execute the process responsive to determining the number falls below a predetermined threshold.

For a better understanding of exemplary embodiments of the invention, together with other and further features and advantages thereof, reference is made to the following description, taken in conjunction with the accompanying drawings, and the scope of the claimed embodiments of the invention will be pointed out in the appended claims.

DETAILED DESCRIPTION

It will be readily understood that the components of the embodiments of the invention, as generally described and illustrated in the figures herein, may be arranged and designed in a wide variety of different configurations in addition to the described exemplary embodiments. Thus, the following more detailed description of the embodiments of the invention, as represented in the figures, is not intended to limit the scope of the embodiments of the invention, as claimed, but is merely representative of exemplary embodiments of the invention.

Reference throughout this specification to "one embodiment" or "an embodiment" (or the like) means that a particular feature, structure, or characteristic described in connection with the embodiment is included in at least one embodiment of the invention. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments of the invention. One skilled in the relevant art will recognize, however, that the various embodiments of the invention can be practiced without one or more of the specific details, or with other methods, components, materials, etc. In other instances, well-known structures, materials, or operations are not shown or described in detail to avoid obscuring aspects of the invention.

Some (commonly used) definitions of terms employed herein are as follows. Core: a core, often termed a single CPU or processor, is the smallest unit of processing power in the system. Chip: a processor chip holds the processing cores. A dual-core processor has two cores per chip; a quad-core processor has four cores per chip and so on. Node: a compute node has two or more processors and shared memory.

It should also be noted that although exemplary embodiments of the invention are described with reference to boosting power to select node(s), the power boosting described herein can also be done at the core level. The compute density per node has increased recently, leading to large number of cores per node. With such multi-core nodes, embodiments of the invention may perform more optimally in identifying the core(s) within the node, rather than simply boosting at node level.

Figure 2:
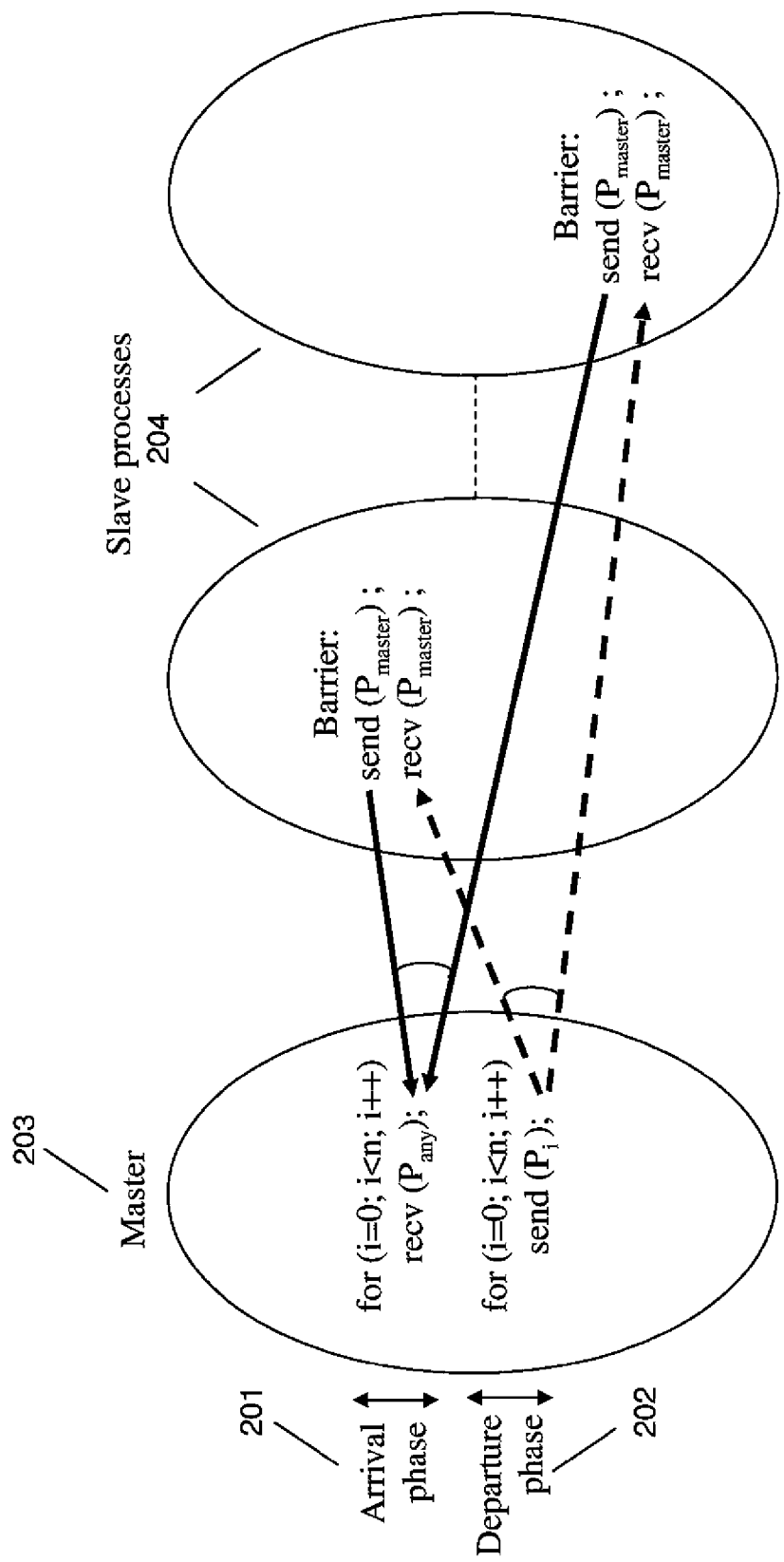
FIG. 2 illustrates a counter-based barrier having two phases in a high performance computing system.

The MPI barrier function is used as a synchronization mechanism for all processes in a communicator, where the processes in a communicator will spread across several nodes of a cluster (refer generally to FIG. 2). If the number of processes is small, then the impact of delay in barrier synchronization is minimal whereas if the number of processes is large, then this delay becomes a very important problem for a cluster environment in terms of application performance and resource usage. For example, if a communicator has 4000 processes and each node has 2 processes (that is, a total of 2000 nodes) and if there is a delay of 2 seconds by one of the processes to reach the barrier, then in the above situation 4000−1 processes to wait for 2 seconds leads to an overall (4000−1)*2 seconds of compute resource wastage.

Embodiments of the invention therefore provide a power management technique for an MPI based HPC cluster with performance improvements for parallel applications. According to various embodiments of the invention, power usage of an MPI based HPC cluster is reduced by boosting the performance of the MPI application so that it takes less time to complete. Embodiments of the invention accomplish this by selectively identifying the appropriate node(s) in the cluster and increasing the computing capacity of the selected node(s). Embodiments of the invention target the MPI barrier function that is used as a synchronization mechanism for all processes in a communicator.

The MPI communicator specifies a group of processes inside which a communication occurs and these processes could be distributed across multiple cluster nodes. According to embodiments of the invention, the MPI barrier synchronization overhead in an MPI cluster is reduced by identifying the appropriate node(s) and momentarily increasing the computing capacity of those node(s).

Accordingly, embodiments of the invention allow high performance computing systems to reduce the total energy consumption of the HPC cluster by finishing any parallel jobs faster by selectively increasing the computing capacity of specific node(s). Moreover, embodiments of the invention reduce the total energy consumption of the HPC cluster to finish any parallel jobs efficiently by selectively increasing the performance and power consumption of specific node(s) in the cluster. Also, embodiments of the invention reduce the MPI barrier synchronization overhead in the cluster by identifying and momentarily increasing the computing capacity of specific node(s).

The description now turns to the figures. The illustrated embodiments of the invention will be best understood by reference to the figures. The following description is intended only by way of example and simply illustrates certain selected exemplary embodiments of the invention as claimed herein.

It should be noted that the flowchart and block diagrams in the figures illustrate the architecture, functionality, and operation of possible implementations of systems, apparatuses, methods and computer program products according to various embodiments of the invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 1:
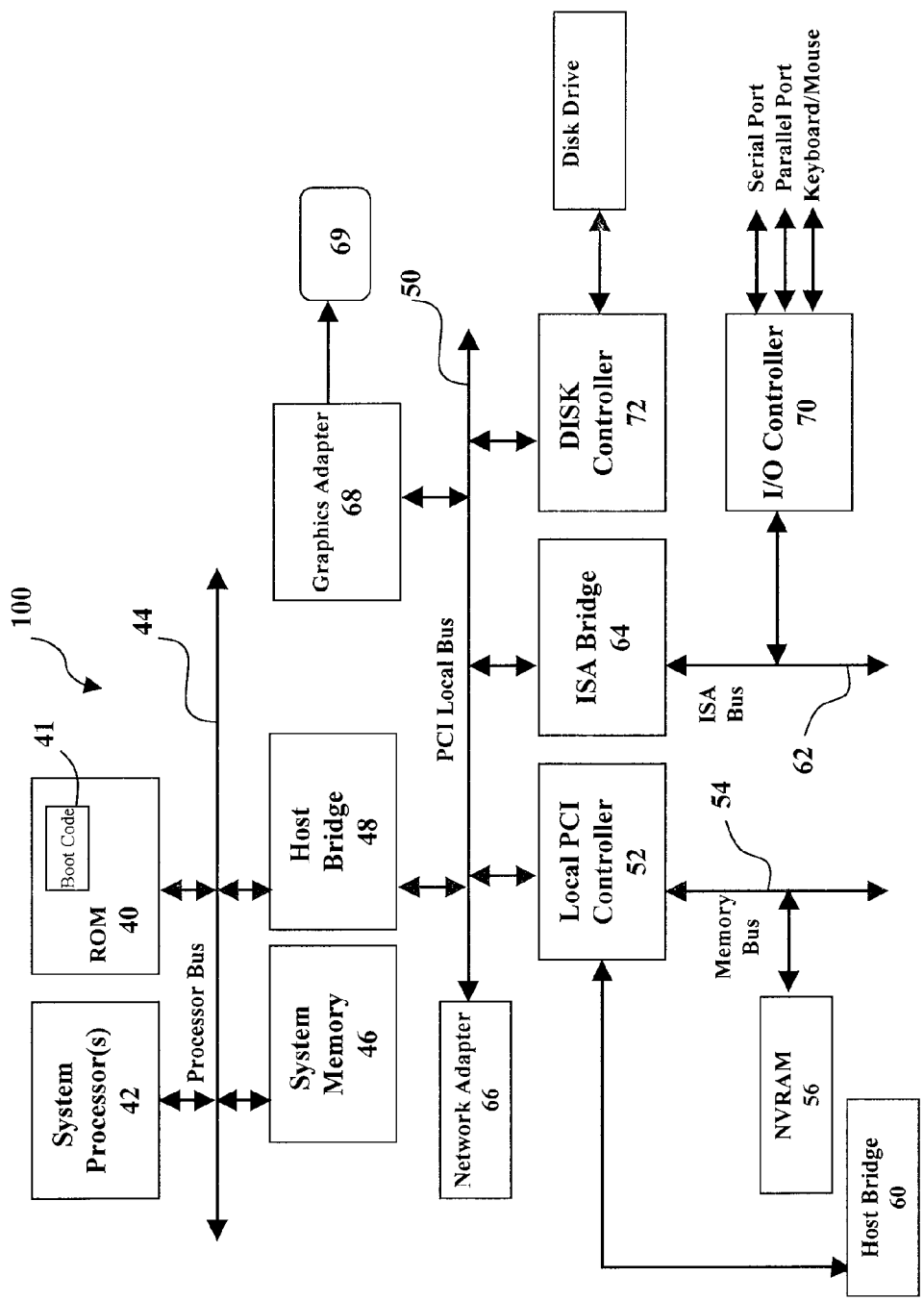
FIG. 1 illustrates a computer system according to an embodiment of the invention.

Referring now to FIG. 1, there is depicted a block diagram of an illustrative embodiment of a computer system 100. The illustrative embodiment depicted in FIG. 1 may be an electronic device such as a computer of a High Performance Computing (HPC) system. As is apparent from the description, however, the embodiments of the invention may be implemented in any appropriately configured device, as described herein.

As shown in FIG. 1, computer system 100 includes at least one system processor 42, which is coupled to a Read-Only Memory (ROM) 40 and a system memory 46 by a processor bus 44. System processor 42, which may comprise one of the AMD line of processors produced by AMD Corporation or a processor produced by INTEL Corporation, is a general-purpose processor that executes boot code 41 stored within ROM 40 at power-on and thereafter processes data under the control of an operating system and application software stored in system memory 46. System processor 42 is coupled via processor bus 44 and host bridge 48 to Peripheral Component Interconnect (PCI) local bus 50.

PCI local bus 50 supports the attachment of a number of devices, including adapters and bridges. Among these devices is network adapter 66, which interfaces computer system 100 to LAN, and graphics adapter 68, which interfaces computer system 100 to display 69. Communication on PCI local bus 50 is governed by local PCI controller 52, which is in turn coupled to non-volatile random access memory (NVRAM) 56 via memory bus 54. Local PCI controller 52 can be coupled to additional buses and devices via a second host bridge 60.

Computer system 100 further includes Industry Standard Architecture (ISA) bus 62, which is coupled to PCI local bus 50 by ISA bridge 64. Coupled to ISA bus 62 is an input/output (I/O) controller 70, which controls communication between computer system 100 and attached peripheral devices such as a as a keyboard, mouse, serial and parallel ports, et cetera. A disk controller 72 connects a disk drive with PCI local bus 50. The USB Bus and USB Controller (not shown) are part of the Local PCI controller (52).

Referring to FIG. 2, a counter-based barrier is illustrated. There are several barrier implementations available (for example, linear/counter based barrier, tree implementation, butterfly barrier, et cetera). The counter-based barrier is available in most of the open source implementations. Exemplary embodiments of the invention described herein are based on this counter-based barrier approach.

Counter-based barriers often have two phases, the arrival phase 201 and the departure phase 202. A process enters the arrival phase 201 and does not leave this phase until all processes have arrived in this phase. Later these processes move to departure phase 202 and are released. At any time the master process 203 keeps a track of all (slave) processes 204 that have executed the barrier function.

Often, processes encounter a significant delay in reaching the barrier function because of the nature of the workload (unfavorable load distribution) or the runtime environment (for example, operating system daemons running on the systems). This results in all the remaining processes waiting in the barrier, unnecessarily. The net result is wastage of power and CPU cycles. Processes waiting on such a blocking call to do synchronization are one of the important reasons for poor performance of the application and which in turn translates to power wastage in an MPI based HPC cluster.

According to embodiments of the invention the slow processes are identified and further mapped to the node(s) level (that is, the system level) and the computing capacity of those identified system(s) are increased so that the time taken by slow processes to reach the barrier function will be reduced. This results in decreasing the overall application execution time and thereby saving power from all the nodes in the cluster, which were otherwise spending time doing nothing.

A detailed exemplary embodiment is now described that provides for a modified MPI barrier implementation on computing systems. The modified MPI barrier implementation is based on the counter/linear barrier that is explained in connection with FIG. 2. Modern computing systems with advanced power management capabilities are equipped with the necessary infrastructure where the execution speed of the processor can be increased beyond the rated capacity for a very short duration so as to not exceed the power and thermal design limit.

A current Barrier Implementation (Linear) is as follows:

```
Master:
for (i = 0; i < n; i++) /* count slaves as they reach their barrier */
recv(P_any);
for (i = 0; i < n; i++) /* release slaves */
send(P_i);
Slaves:
send(P_master);
recv(P_master);
```

A Barrier Implementation according to an exemplary embodiment of the invention is as follows:

```
Master:
start_time = get_time( );
for (i = 0; i < n; i++) /* count slaves as they reach their barrier */
{
recv(P_any);
diff_time = get_time( )–start_time
/* create a bit mask and track the processes yet to arrive */
pending_task = pending_task .xor. status.(MPI_SOURCE)
if ((diff_time > wait_threshold) && i < task_threshold))
    boost_compute_capacity(pending_task);
}
for (i = 0; i < n; i++) /* release slaves */
send(P_i);
Slaves:
send(P_master);
recv(P_master);
handle_boost_request_thread on the Slaves
activate_boost( );
sleep(x);
deactivate_boost( );
```

Figure 3:
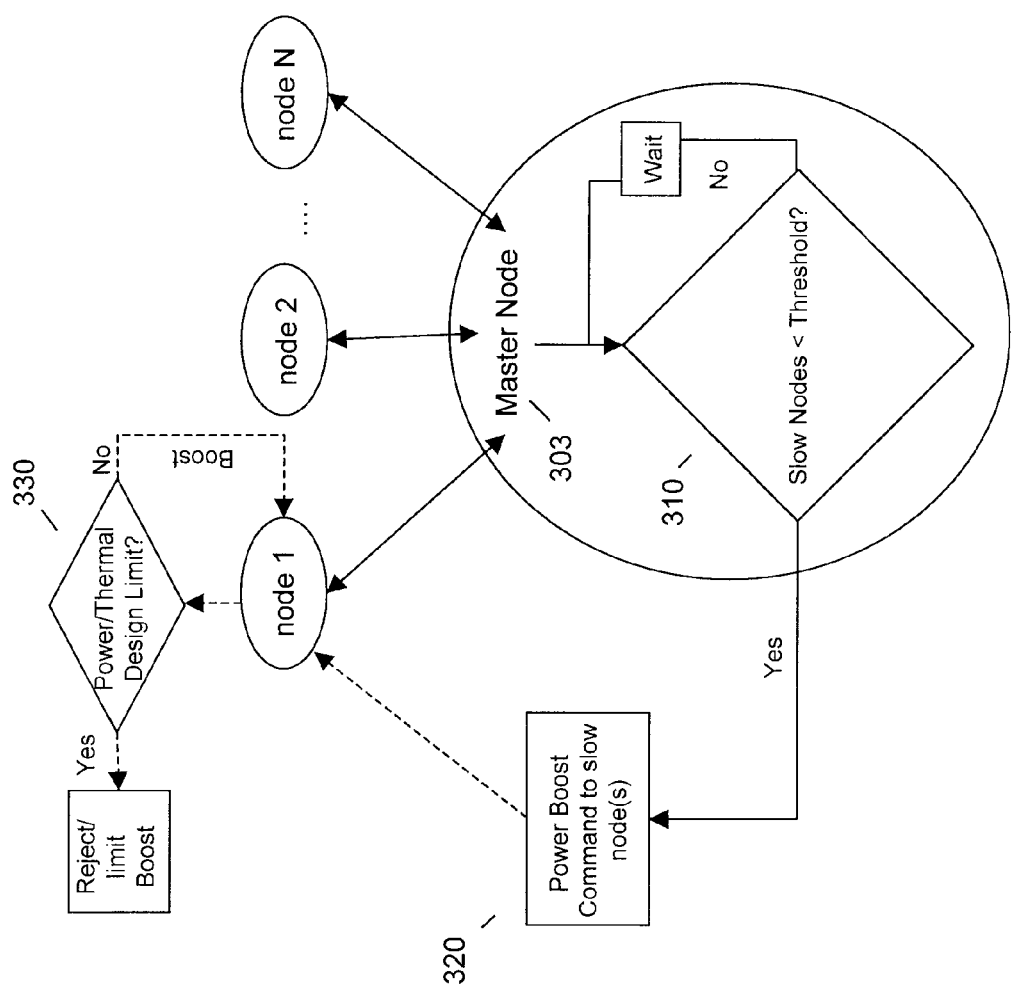
FIG. 3 illustrates a high performance computing system according to an embodiment of the invention.

FIG. 3 illustrates an exemplary embodiment of the invention. According to the modified Barrier Implementation mentioned above, the master node 303 keeps track of the slow processes (that is, systems/nodes (node 1, node 2, ... node N) whose processes are yet to reach the barrier. If the total number of slow processes/nodes decreases below a predefined threshold, it sends a boost command to the slow systems (node 1 in this example) to activate the infrastructure for increasing the compute capacity. The boost command is handled in the slave systems (node 1 here) either out-of-band via management card or in-band. For in-band handling, a high priority thread (handle_boost_request_thread) running on the system will receive the command from the master system and activate the boost. The wait_threshold and task_threshold variables can be a kernel variable and further exported through proc or sys file system to the user. This way, these threshold values can be tuned to have an optimal value for any given workload.

As described herein, current generation computing systems are equipped with necessary infrastructure where the execution speed of the processor can be increased beyond the rated capacity for a very short duration so as to not exceed the power and thermal design limit. As shown, the power boost command can be limited/ended or rejected if it is determined 330 that a power/thermal threshold of the system is reached. The proposed optimization in MPI barrier will optimally exploit the hardware/platform performance boost feature to significantly reduce barrier synchronization overhead and improve application performance.

It should be noted that the above implementation is relatively simplistic and has been used as an example, and it will be readily understood by those having ordinary skill in the art that the exemplary implementation can be modified to have a robust error checking, et cetera. For example, the above-described implementation can be modified so as to maintain a global count of boost requests and the last time of activation of the boost infrastructure. This information can be accessed by the management cards for deciding whether to activate the boost infrastructure out-of-band based on reliability attributes and environmental factors like system operating temperature. This information can also be used by the Operating System for deciding whether to activate the throttling infrastructure in-band. An example usage of this global data is as follows.

If the time of last activation is less than a predefined threshold value (say "X" seconds) then the management card (out-of-band) or the high-priority OS thread (in-band) can decide not to activate the boost infrastructure. It should also be noted that the boost can be at a node level or at a core level and the implementation can be modified suitably. Boost requests on each node can be implemented on a best effort basis leading to a propositional reduction in barrier synchronization overhead. In the event that the boost request is turned down by the node, then the system operates with baseline performance and there is no functional impact based on this decision.

In brief recapitulation, embodiments of the invention broadly contemplate systems, methods, apparatuses and program products providing a power management technique for an MPI based HPC cluster with performance improvements for parallel applications. According to various embodiments of the invention, power usage of an MPI based HPC cluster is reduced by boosting the performance of the MPI application so that it takes less time to complete. Embodiments of the invention accomplish this by selectively identifying the appropriate node(s) in the cluster and increasing the computing capacity of the selected node(s).

It should be noted as well that aspects of the invention may be embodied as a system, method or computer program product. Accordingly, aspects of the invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the invention may be written in any combination of one or more programming languages, including an object oriented programming language such as Java®, Smalltalk, C++ or the like and conventional procedural programming languages, such as the "C" programming language or similar programming languages. The program code may execute entirely on the user's computer (device), partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

This disclosure has been presented for purposes of illustration and description but is not intended to be exhaustive or limiting. Many modifications and variations will be apparent to those of ordinary skill in the art. The embodiments were chosen and described in order to explain principles and practical application, and to enable others of ordinary skill in the art to understand the disclosure for various embodiments with various modifications as are suited to the particular use contemplated.

Although illustrative embodiments of the invention have been described herein with reference to the accompanying drawings, it is to be understood that the embodiments of the invention are not limited to those precise embodiments, and that various other changes and modifications may be affected therein by one skilled in the art without departing from the scope or spirit of the disclosure.

What is claimed is:

1. A system comprising:
   one or more processors; and
   a computer readable storage medium having computer readable program code embodied therewith and executable by the one or more processors, the computer readable program code comprising:
   computer readable program code configured to provide a master node configured to track one or more processes executing on one or more nodes of the system;
   computer readable program code configured to determine a number of the one or more nodes executing one or more processes in the system that are slow to reach a barrier function used in synchronization; and
   computer readable program code configured to send a boost command to the one or more nodes slow to reach the barrier function responsive to determining the number falls below a predetermined threshold.

2. The system according to claim 1, wherein the boost command is configured to activate an infrastructure for increasing processor execution speed existing on the one or more nodes slow to reach the barrier function.

3. The system according to claim 1, wherein the barrier function comprises a Message Passing Interface linear, counter-based barrier function.

4. The system according to claim 1, further comprising:
   computer readable program code configured to implement one or more boost commands at a core level, comprising:
   computer readable program code configured to determine a number of cores of the one or more nodes in the system that are slow to execute a process; and
   computer readable program code configured to send a boost command to one or more cores of the one or more nodes responsive to determining the number of cores of the one or more nodes falls below a predetermined threshold.

5. The system according to claim 1, wherein the boost command is configured to be received by a high priority thread running on the one or more nodes slow to reach the barrier function.

6. The system according to claim 2, wherein the boost command is further configured to increase a capacity of a processor of the one or more nodes slow to reach the barrier function beyond a rated processing speed capacity of the processor for a short duration such that a power limit and thermal limit of the processor are not exceeded.

7. The system according to claim 6, further comprising computer readable program code configured to maintain a global count of boost requests sent to the one or more nodes slow to reach the barrier function and a last time of activation of the infrastructure of the one or more nodes;
   wherein said global count is accessed for deciding whether to activate the infrastructure in-band or out-of-band.

8. The system according to claim 1, further comprising:
   computer readable program code configured to provide a user interface for modulating one or more thresholds related to implementing the boost command.

9. The system according to claim 1, further comprising the one or more nodes of the system.

10. A method comprising:
    providing a master node configured to track one or more processes executing on one or more nodes of a system;
    determining a number of the one or more nodes executing one or more processes in the system that are slow to reach a barrier function used in synchronization; and
    sending a boost command to the one or more nodes slow to reach the barrier function responsive to determining the number falls below a predetermined threshold.

11. The method according to claim 10, wherein the boost command is configured to activate an infrastructure for increasing processor execution speed existing on the one or more nodes slow to reach the barrier function.

12. The method according to claim 10, wherein the barrier function comprises a Message Passing Interface linear, counter-based barrier function.

13. The method according to claim 10, further comprising:
    implementing one or more boost commands at a core level, the implementing comprising:
    determining a number of cores of the one or more nodes in the system that are slow to execute a process; and
    sending a boost command to one or more cores of the one or more nodes responsive to determining the number of cores of the one or more nodes falls below a predetermined threshold.

14. The method according to claim 10, wherein the boost command is configured to be received by a high priority thread running on the one or more nodes slow to reach the barrier function.

15. The method according to claim 11, wherein the boost command is further configured to increase a capacity of a processor of the one or more nodes slow to reach the barrier function beyond a rated processing speed capacity of the processor for a short duration such that a power limit and thermal limit of the processor are not exceeded.

16. The method according to claim 15, further comprising maintaining a global count of boost requests sent to the one or more nodes slow to reach the barrier function and a last time of activation of the infrastructure of the one or more nodes; wherein said global count is accessed for deciding whether to activate the infrastructure in-band or out-of-band.

17. A computer program product comprising:
a computer readable storage medium having computer readable program code embodied therewith, the computer readable program code comprising:
computer readable program code configured to provide a master node configured to track one or more processes executing on one or more nodes of a system;
computer readable program code configured to determine a number of the one or more nodes executing one or more processes in the system that are slow to reach a barrier function used in synchronization; and
computer readable program code configured to send a boost command to the one or more nodes slow to reach the barrier function responsive to determining the number falls below a predetermined threshold.

18. The computer program product according to claim 17, wherein the boost command is configured to activate an infrastructure for increasing processor execution speed existing on the one or more nodes slow to reach the barrier function.

19. The computer program product according to claim 17, wherein the barrier function comprises a Message Passing Interface linear, counter-based barrier function.

20. The computer program product according to claim 17, further comprising:
computer readable program code configured to implement one or more boost commands at a core level, comprising:
computer readable program code configured to determine a number of cores of the one or more nodes in the system that are slow to execute a process; and
computer readable program code configured to send a boost command to one or more cores of the one or more nodes responsive to determining the number of cores of the one or more nodes falls below a predetermined threshold.

21. The computer program product according to claim 17, further comprising:
computer readable program code configured to provide a user interface for modulating one or more thresholds related to implementing the boost command.

* * * * *